(12) United States Patent
Kojima (10) Patent No.: US 7,873,834 B2
(45) Date of Patent: Jan. 18, 2011

(54) IMAGE FORMING APPARATUS, STORAGE MEDIUM STORING PROGRAM FOR ACQUIRING TIME STAMP, DIGITAL DATA MANAGEMENT SYSTEM, AND METHOD FOR ACQUIRING TIME STAMP

(75) Inventor: Shunichi Kojima, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1104 days.

(21) Appl. No.: 11/357,668

(22) Filed: Feb. 17, 2006

(65) Prior Publication Data
US 2007/0022462 A1    Jan. 25, 2007

(30) Foreign Application Priority Data
Jul. 21, 2005    (JP) .............................. 2005-211912

(51) Int. Cl.
    *H04L 9/32*    (2006.01)
    *G06F 9/32*    (2006.01)
(52) U.S. Cl. ..................... 713/178; 713/176; 382/284
(58) Field of Classification Search ....................... None
    See application file for complete search history.

(56) References Cited

U.S. PATENT DOCUMENTS

| | | | |
|---|---|---|---|
| 4,646,160 A * | 2/1987 | Iizuka et al. ................. 358/402 |
| 6,490,371 B1 * | 12/2002 | Aoki et al. .................... 382/232 |
| 6,512,856 B1 * | 1/2003 | Davis ........................... 382/284 |
| 7,636,733 B1 * | 12/2009 | Rothmuller ......................... 1/1 |
| 2005/0094178 A1 * | 5/2005 | Anno .......................... 358/1.13 |

FOREIGN PATENT DOCUMENTS

| | | |
|---|---|---|
| JP | 2002116694 | 4/2002 |
| JP | 2003323512 | 11/2003 |

* cited by examiner

*Primary Examiner*—Kaveh Abrishamkar
(74) *Attorney, Agent, or Firm*—Gauthier & Connors LLP (57) ABSTRACT

An image forming apparatus having a network communication function, includes a data input unit which inputs digital data; a data transmission unit which transmits the input digital data to a data management server for management of data; a digest generation unit which generates a digest of the input digital data; a digest storage unit which stores the digest generated by the digest generation unit; a time stamp acquisition unit which acquires a time stamp for authentication of an input time of the digital data from a time stamp station by issuing a time stamp request including the stored digest at a scheduled time; and a data management directive unit which transmits the acquired time stamp to the data management server for management of the time stamp and the transmitted digital data, associated with each other.

12 Claims, 7 Drawing Sheets

| FORM ID | SCHEDULED TIME |
|---------|----------------|
| F00 | 22:00 |
| F01 | 18:00 |
| F02 | 18:00 |
| F03 | 22:00 |
| | |

| DOCUMENT ID | HASH VALUE | SCHEDULE INFORMATION |
|---|---|---|
| ID01 | Bsosdh7asfkB | 22:00 |
| ID02 | ssfSFflaw3dD | 22:00 |
| ID03 | 1sfkswFfawG | 18:00 |
| | | |

APPLICATION SCAN FORM

APPLICATION NUMBER

☐☐ ☐☐ ☐☐ ☐☐ ☐☐ ☐☐ ☐☐ ☐☐ ☐☐ ☐☐

DOCUMENT
☐APPLICATION FORM
☐APPLICATION FORM + USER IDENTIFICATION
☐USER IDENTIFICATION

TYPE OF USER IDENTIFICATION FORM
☐DRIVER LICENSE  ☐PASSPORT
☐BASIC ADDRESS REGISTRATION CARD
☐ALIEN REGISTRATION CERTIFICATE
☐VARIOUS HEALTH INSURANCES   ☐VARIOUS PENSION BOOKS
☐VARIOUS WELFARE BOOKS

TIME STAMP
☐NECESSARY          ☐UNNECESSARY
☐SPECIFIED TIME  ☐☐ ☐☐ ☐☐ ☐☐
☐NEXT STANDARD TIME

IMAGE FORMING APPARATUS, STORAGE MEDIUM STORING PROGRAM FOR ACQUIRING TIME STAMP, DIGITAL DATA MANAGEMENT SYSTEM, AND METHOD FOR ACQUIRING TIME STAMP

PRIORITY INFORMATION

This application claims priority to Japanese Patent Application No. 2005-211912, filed on Jul. 21, 2005, which is incorporated herein by reference in its entirety.

BACKGROUND

1. Technical Field

The present invention relates to a image forming apparatus, storage medium storing a program, digital data management system, and a method for acquiring a time stamp issued by a time stamp station for authentication of a time of generation of digital data.

2. Related Art

When digital data of an electronic document file, etc. are generated in a computer, the time of generation (hereinafter called generation time) is generally set by a system as the attribute information about the digital data. Although the generation time is normally considered attribute information which should not be changed, in practice it can be rewritten like general data. That is, since digital data can be freely generated as data having a past or future time, when the digital data were generated cannot be confirmed by reference to only the attribute information.

Presently, a time stamp station of a third party is provided in order to authenticate the generation time of digital data. That is, when a user transmits to the time stamp station a time stamp request including the digest (hash value) of the digital data, the time stamp station adds time information to the transmitted digest, places a digital signature by means of a private key of the time stamp station, and then returns the signed digest. The returned information is generally referred to as a "time stamp token". When the user wishes to certify the presence of the digital data at a certain time, the user requests to verify the time stamp by transmitting to the time stamp station the digest with the time stamp of the digital data added thereto. Upon receipt of the request, the time stamp station verifies the transmitted time stamp by means of the digital signature. Thus, the user can certify that the digital data existed at the certain time.

A recent image forming apparatus such as a multi-functional device is loaded with a computer, and can process a large amount of various image data by virtue of including a facsimile function, a mail function, etc. in addition to a scan function and a copy function. The read image data tend to have the opportunity to be stored as digital data based on, for example, the e-Document Law put into effect on Apr. 1, 2005 in Japan. An image forming apparatus is basically not a device for accumulating and managing read data. Therefore, the image forming apparatus transmits read data to a document management server, etc. for management of a document through a network to separately manage the read data according to the operation of the document management system.

When an image acquired by the image forming apparatus is for example, a confidential document, the user may desire that the document be stored and managed after the above-mentioned time stamp is acquired and added to the document. In the conventional image forming apparatus, a time stamp is readily acquired after a confidential document is read, is added to the document and transmitted to the document management server.

However, in the image forming apparatus, acquiring a time stamp each time digital data is generated is not necessarily appropriate. For example, since a client terminal device formed by a general-purpose personal computer (PC), etc. is used privately, few problems are considered to occur when a time stamp is acquired each time digital data are generated with relationships with other users and processes taken into account. On the other hand, the image forming apparatus is shared among multiple users. Therefore, when digital data are generated by reading an image, a conventional image forming apparatus acquires a time stamp from a time stamp station and adds it to the digital data, and transmits the digital data with the time stamp added thereto to the document management server, thereby performing a series of data processing operations. That is, performing the series of processing operations each time the digital data is generated is not always appropriate, from the viewpoint of processing load, etc. Therefore, the image forming apparatus desirably has the ability to acquire a time stamp with appropriate timing.

SUMMARY

An image forming apparatus according to the present invention has a network communication function, and includes a data input unit which inputs digital data; a data transmission unit which transmits the input digital data to a data management server for management of data; a digest generation unit which generates a digest of the input digital data; a digest storage unit which stores the digest generated by the digest generation unit; a time stamp acquisition unit which acquires a time stamp for authentication of an input time of the digital data from a time stamp station by issuing a time stamp request including the stored digest at a scheduled time; and a data management directive unit which transmits the acquired time stamp to the data management server for management of the time stamp and the transmitted digital data, associated with each other.

A storage medium according to the present invention is readable by a computer, and stores a program of instructions executable by the computer to perform a function for time stamp acquisition, the function includes inputting digital data; transmitting the input digital data to a data management server for management of data; generating a digest of the input digital data; storing the digest generated by the digest generation unit; acquiring a time stamp for authentication of an input time of the digital data from a time stamp station by issuing a time stamp request including the stored digest at a scheduled time; and transmitting the acquired time stamp to the data management server for management of the time stamp and the transmitted digital data, associated with each other.

A digital data management system according to the present invention includes a data input unit which inputs digital data; a digital data storage unit which stores the digital data; a digest generation unit which generates a digest of the input digital data; a digest storage unit which stores the digest generated by the digest generation unit; a time stamp acquisition unit which acquires a time stamp for authentication of an input time of the digital data from a time stamp station by issuing a time stamp request including the stored digest at a scheduled time; and a time stamp addition unit which adds the acquired time stamp to the stored digital data.

A time stamp acquiring method according to the present invention includes inputting digital data; transmitting the input digital data to a data management server for management of data; acquiring a time stamp for authentication of an input time of the digital data from a time stamp station by issuing a time stamp request including a digest generated from the transmitted digital data at a scheduled time; and transmitting the acquired time stamp to the data management server for management of the time stamp and the transmitted digital data, associated with each other.

BRIEF DESCRIPTION OF THE DRAWINGS

Embodiments of the present invention will be described in detail by reference to the following figures, wherein.

DETAILED DESCRIPTION

Embodiments of the present invention are explained below by reference to the attached drawings. It should be noted, however, the present invention is not limited to the specific embodiments described in the present specification.

First Embodiment

Figure 1:
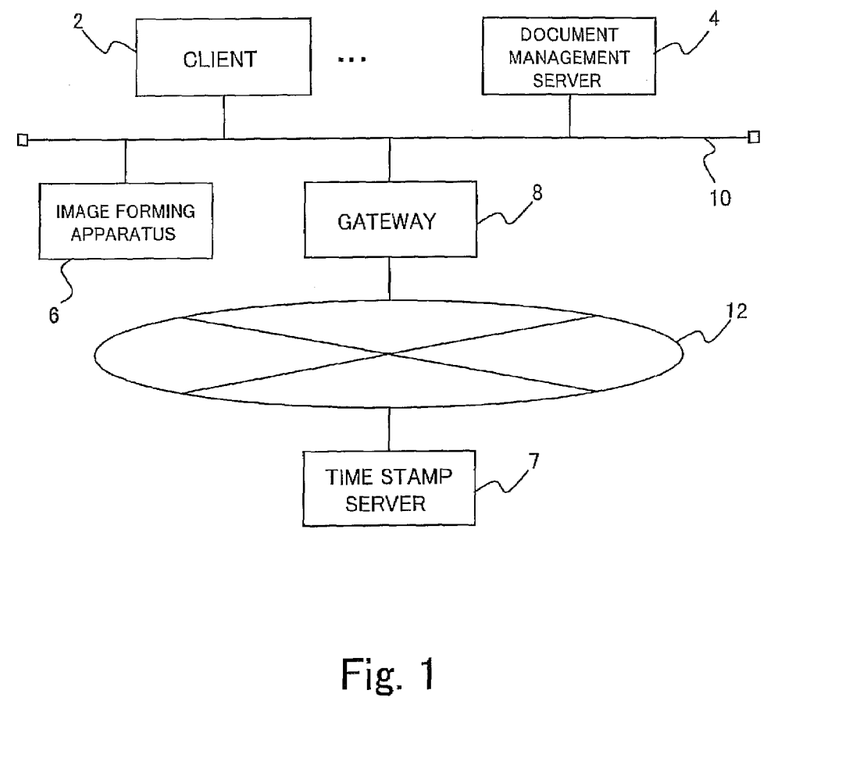
FIG. 1 shows the overall configuration of an electronic document management system according to a first embodiment of a digital data management system according to the present invention.

FIG. 1 shows the overall configuration of an electronic document management system according to an embodiment of the digital data management system of to the present invention. FIG. 1 shows an electronic document management system formed by connecting multiple clients 2, a document management server 4, an image forming apparatus 6, and a gateway 8 via a LAN (local area network) 10. The electronic document management system according to the present embodiment is connected to a public network 12 via the gateway 8 so that it can communicate information with a time stamp server 7 mounted in a time stamp station. According to the present embodiment, an existing time stamp server can be used as is. The client 2 is a computer such as a PC, used by a user of the image forming apparatus 6. The document management server 4 is a server computer which integrates, stores, and manages electronic documents to be processed in the electronic document management system. The image forming apparatus 6 is a device which forms image data.

According to the present embodiment, the image forming apparatus is considered to be a multi-functional device which is provided with various functions such as a scan function, a copy function, a facsimile function, and a mail function and is loaded with a computer.

Figure 2:
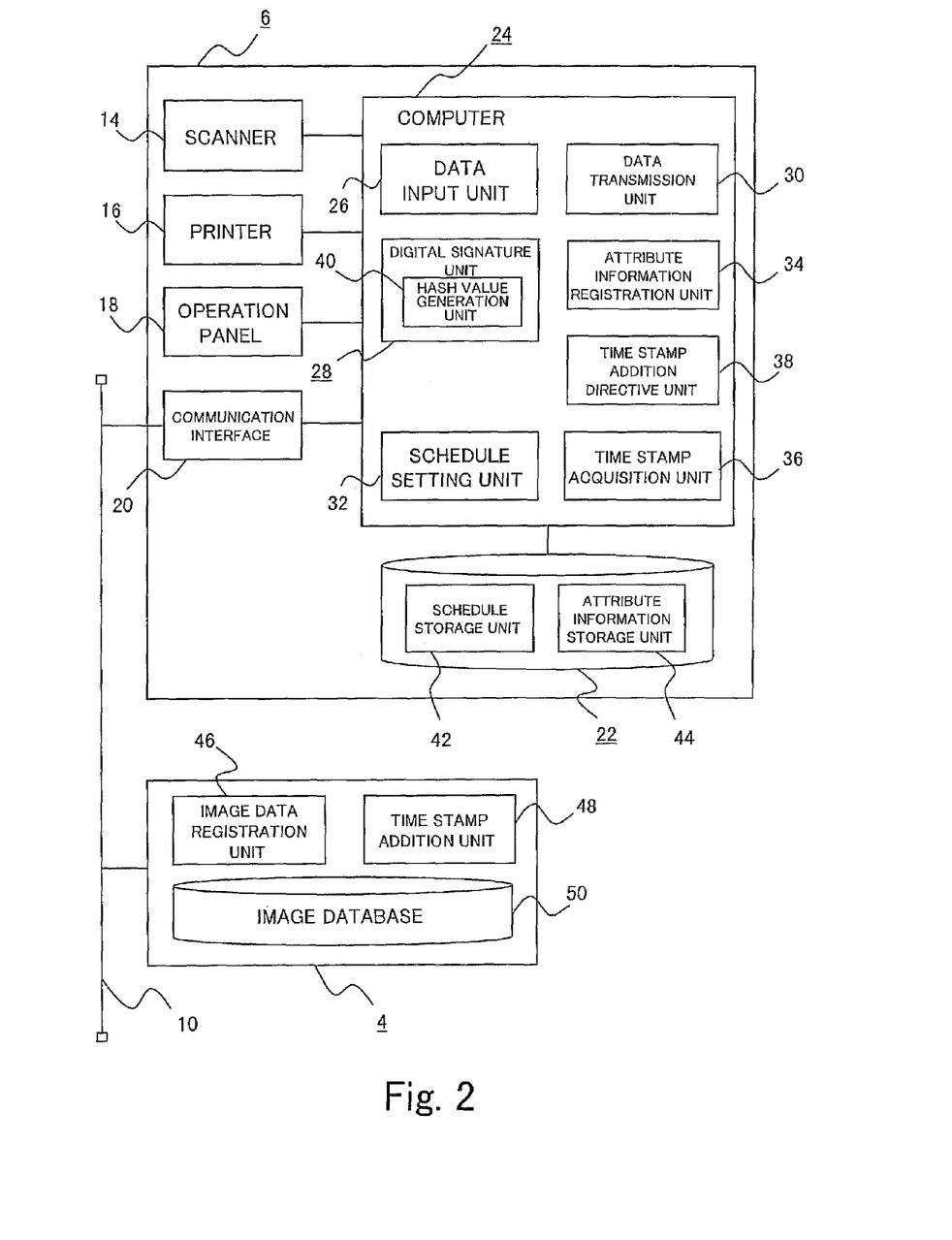
FIG. 2 is a block diagram showing the configuration of the image forming apparatus and the document management server according to the first embodiment.

FIG. 2 is a block diagram showing the configuration of the image forming apparatus 6 and the document management server 4 according to the first embodiment. The image forming apparatus 6 according to the present embodiment is equipped with various hardware, including a scanner 14, a printer 16, an operation panel 18, a communication interface 20, a hard disk device 22, and a computer 24. The hardware is fundamentally and conventionally equipped as an image forming apparatus. The computer 24 includes a data input unit 26, a digital signature unit 28, a data transmission unit 30, a schedule setting unit 32, an attribute information registration unit 34, a time stamp acquisition unit 36, and a time stamp addition directive unit 38. The data input unit 26 inputs image data acquired by the image forming apparatus 6. For example, it inputs as image data the read image on a form read by the scanner 14 when, for example, a scan function, a copy function, a facsimile transmission function, or the like is used, or the electronic document, etc. transmitted through the LAN 10 when the mail function or the printer function is used. The digital signature unit 28 generates a signature to be added to the image data input by the data input unit 26. A hash value generation unit 40 contained in the digital signature unit 28 generates a hash value (digest) when a signature is placed. The data transmission unit 30 transmits to the document management server 4 the image data to which a digital signature is added. The schedule setting unit 32 designates timing at which a time stamp to be added to the input image data is acquired, by referring to schedule information set in a schedule storage unit 42. The attribute information registration unit 34 registers in the attribute information storage unit 44 a hash value generated when a schedule set in each piece of image data and a signature are added as the attribute information. The time stamp acquisition unit 36 acquires a time stamp at timing according to the schedule set in each piece of image data. The time stamp addition directive unit 38 indicates the transmitted image data to be associated with the time stamp to be transmitted, by transmitting the acquired time stamp to the document management server 4.

The processing functions of the components 26 to 38 of the computer 24 of the image forming apparatus 6 are realized by cooperative operations of the time stamp acquisition program having the process functions and the respective pieces of the hardware 14 to 24 forming the image forming apparatus 6.

The document management server 4 is a server computer which integrates and manages an electronic document transmitted from the image forming apparatus 6 or the client 2, and includes an image data registration unit 46 that holds an electronic document by registering in an image database 50 the image data transmitted from the image forming apparatus 6, etc. In the present embodiment, a conventional document management server 4 can be used. However, as is apparent from an explanation given later, there is provided a time stamp addition unit 48 for adding a time stamp transmitted from the image forming apparatus 6 to the corresponding image data registered in the image database 50, because the time stamp is added later to the image data registered in the image database 50. The processing functions of the image data registration unit 46 and the time stamp addition unit 48 are realized by cooperative operation of a program having the processing functions and the hardware forming the document management server 4.

Figure 3:
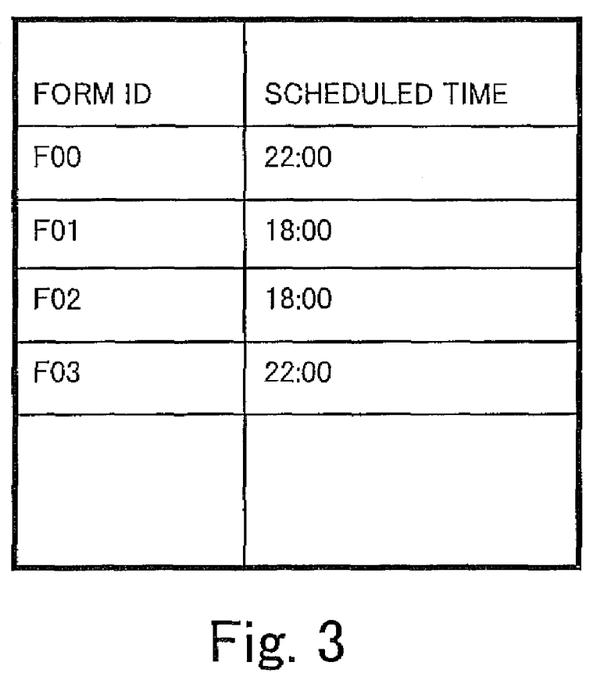
FIG. 3 shows an example configuration of data registered in a schedule storage unit according to the first embodiment.

FIG. 3 shows an example configuration of the data registered in the schedule storage unit 42 according to the present embodiment. A set made up of a form ID designating the document form of the read document image and a scheduled time is registered in advance in the schedule storage unit 42.

The characteristic of the present embodiment lies in that the timing of acquiring a time stamp to be added to the input image data can be set separately from the registration of image data in the document management server 4. The characteristic operation of the present embodiment is explained below.

The present embodiment can be roughly divided into processing performed when image data are acquired and processing performed when a time stamp is acquired. Therefore, the processing performed when image data are acquired is first explained below by reference to the flowchart shown in FIG. 4. All of the image data processed in the present embodiment can be data to acquire time stamps.

Figure 4:
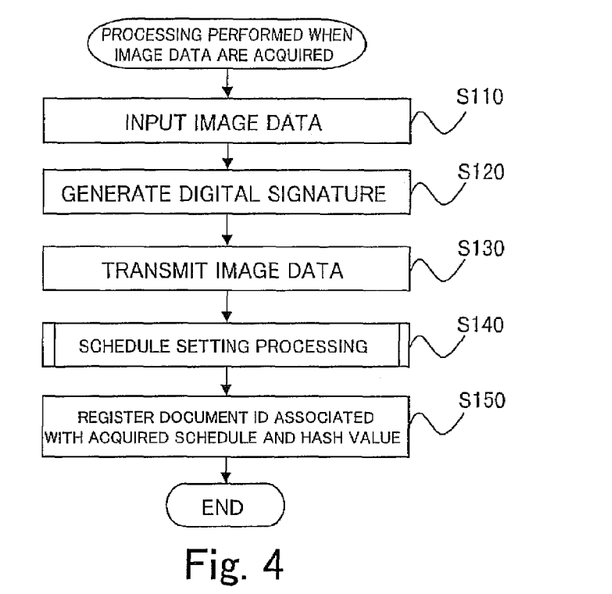
FIG. 4 is a flowchart showing processing performed when image data are acquired according to the first embodiment.

For example, when the data input unit 26 inputs image data (step 110) by scanning paper to be read by the scanner 14 of the image forming apparatus 6, the digital signature unit 28 generates a signature to be placed on the image data (step 120). Since a digital signature is not the gist of the present embodiment, explanation thereof is omitted here. Afterwards, the data transmission unit 30 transmits to the document management server 4 the image data on which a signature is placed (step 130). At this time, the data transmission unit 30 first adds to the image data the document ID of a read document as the information identifying the image data, and then transmits the data.

In the document management server 4, when the image data registration unit 46 receives the image data from the image forming apparatus 6, it registers the data in the image database 50.

According to the present embodiment, image data are transmitted to the document management server 4 without acquiring a time stamp when the image data are acquired as described above. However, the time stamp is to be acquired sooner or later and added to the image data. After the image data are transmitted, the schedule setting unit 32 performs a schedule setting process to designate the time of acquisition of the time stamp to be added to the transmitted image data (step 140). The schedule setting processing performed by the schedule setting unit 32 is explained below by reference to the flowchart shown in FIG. 5.

Figure 5:
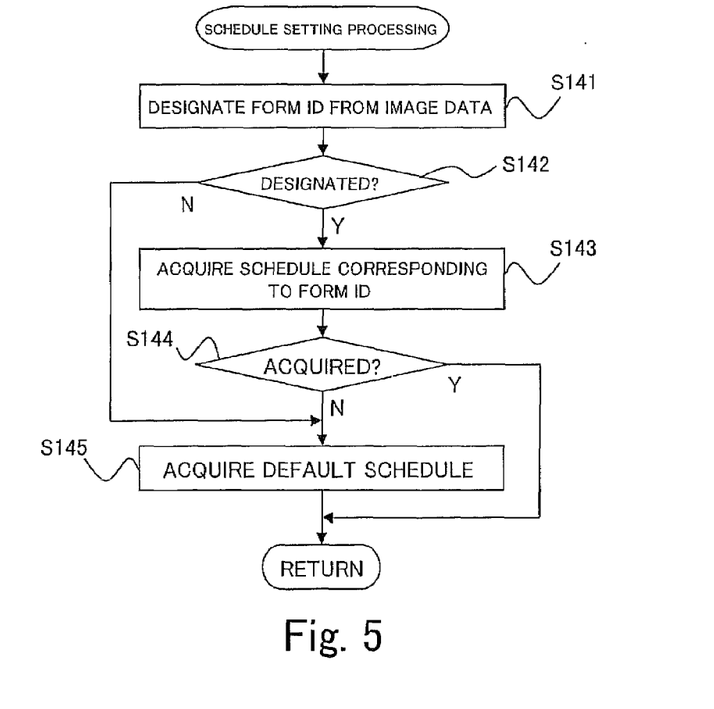
FIG. 5 is a flowchart showing the schedule setting process according to the first embodiment 1.

The schedule setting unit 32 recognizes the form of the read paper, by analyzing the image of the corresponding image data, and designates the form ID (step 141). Described below is the reason for designating the form ID in the present embodiment and the reason for registering in advance a set made up of a form ID and a scheduled time in the schedule storage unit 42.

The steps of acquiring a time stamp from a time stamp station by an organization of a third party for authentication of a generation time of an electronic document, adding it to the corresponding electronic document, and managing it are as described above. The electronic document managed after authentication of the generation time is considered to be read data of an important document for a corporation such as a contract form, a bill, etc. The documents, such as contract forms, etc., are in many cases standardized forms. A standardized form is assigned an identification number specific thereto; that is, a form ID, and in many cases a standardized form has a form ID printed at a predetermined position; for example, at the corner of the form. Recently, a form ID has been recorded on an ID tag embedded in the form. In the present embodiment, the schedule setting unit 32 is provided, the form ID is extracted from a predetermined area of the read image data, and the time associated with the form ID is read from the schedule storage unit 42 as the schedule information set for the image data. That is, in the present embodiment, the schedule information set for each form is acquired and automatically set as the time schedule of the image data. For example, if the form ID designated from the image data is "F01", as is apparent from FIG. 3, "F01" is registered in the schedule storage unit 42 (step 142). Therefore, the schedule of acquiring a time stamp at 18:00 has been set for the image data having the form ID "F01" (step 143). In the present embodiment, a form ID is used as the information designating the schedule for the corresponding image data from the data set in advance.

If a result of an analysis of image data shows that no form ID is designated (step 142), or if a corresponding form ID is not registered in the schedule storage unit 42 even after the form ID is designated (step 144), in the present embodiment, in which a time stamp is assumed to be added to all image data, the default schedule is set for image data by reference to the record having the form ID "F00" registered in the schedule storage unit 42 as a default (step 145).

Figure 6:
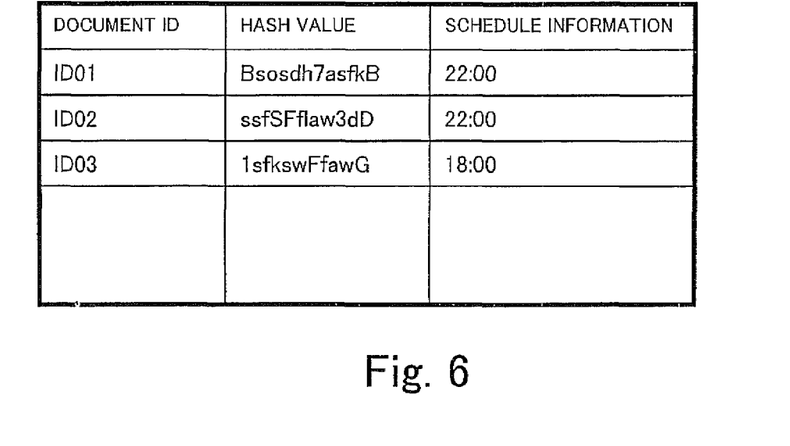
FIG. 6 shows an example of attribute information registered in the attribute information storage unit according to the first embodiment 1.

Turning back to FIG. 4, when the schedule for the transmitted image data is set as described above, the attribute information registration unit 34 associates the document ID identifying corresponding image data with the schedule designated by the schedule setting unit 32 and the hash value generated in the process of the hash value generation unit 40 in the digital signature unit 28 generating a signature, and registers resultant data as the attribute information about the image data in the attribute information storage unit 44 (step 150). FIG. 6 shows an example of the attribute information registered in the attribute information storage unit 44.

The processing performed when image data is acquired in the present embodiment is described above, but the processing is executed by the data input unit 26 reading an image by means of the scanner 14, or each time an electronic document transmitted over a network is received. Therefore, the attribute information storage unit 44 stores the attribute information each time image data is input.

Figure 7:
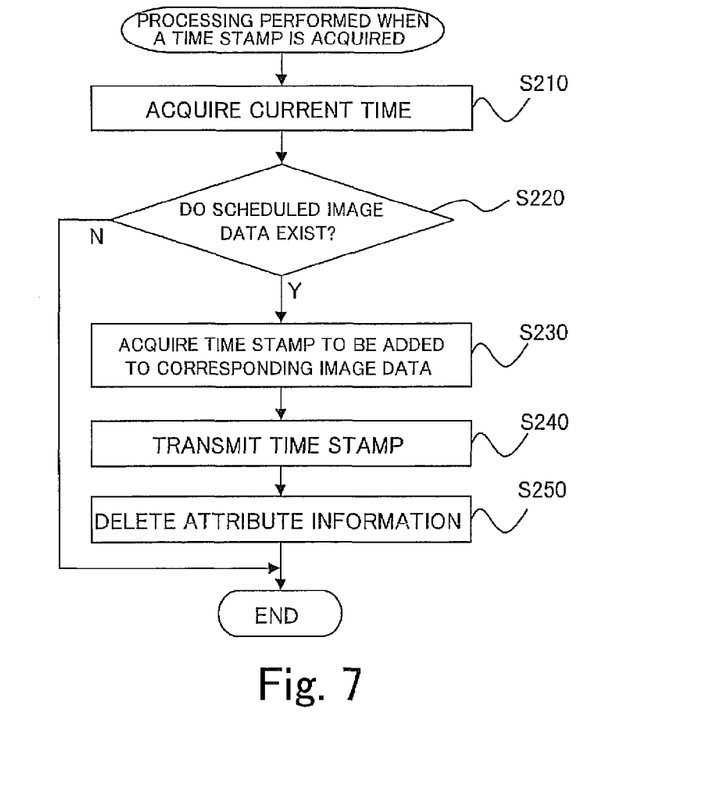
FIG. 7 is a flowchart showing processing performed when a time stamp is acquired according to the first embodiment.

The processing performed when a time stamp is acquired is explained by reference to the flowchart shown in FIG. 7. Not only in the processing performed when a time stamp is acquired described below, but also in the above-mentioned processing performed when image data is acquired, the program for executing each processing step continuously performs the processing is stored as a resident program in the memory of the computer 24. In each flowchart, each process terminates as convenient, and can be performed each time as necessary in the flowchart shown in FIG. 7.

The time stamp acquisition unit 36 acquires the current time from a time counting device (not shown in the attached drawings) of the computer 24 at predetermined time intervals (step 210). Then, by reference to the schedule information about each piece of image data registered in the attribute information storage unit 44, a check is made as to presence/absence of image data which have reached their scheduled time (step 220). If the result shows that corresponding image data exist, the time stamp acquisition unit 36 reads the hash value of the image data from the attribute information storage unit 44, and transmits a time stamp request including the hash value to the time stamp server 7, thereby acquiring a time stamp for the image data (step 230). Then, by transmitting the time stamp acquired from the time stamp acquisition unit 36 to the document management server 4, the time stamp addition directive unit 38 indicates the transmitted image data to be associated with the time stamp to be transmitted (step 240).

At this time, the time stamp addition directive unit 38 first adds to the time stamp a document ID as the information designating the image data to which the time stamp is added, and then transmits the resultant data.

In the document management server 4, the time stamp addition unit 48 adds the time stamp transmitted from the image forming apparatus 6 to the corresponding image data registered in the image database 50. A more specific explanation is given as follows. That is, the time stamp addition unit 48 retrieves image data by searching the image database 50 while using as a key the document ID transmitted with the time stamp, adds the time stamp to the image data, and registers the data again the image database 50.

When the process of adding a time stamp to the image data is confirmed to have terminated normally, the time stamp addition directive unit 38 deletes the attribute information about the image data to be processed from the attribute information storage unit 44 (step 250). Thus, repeating the same processing can be avoided. If multiple pieces of image data have reached the scheduled time, the processes in steps 230 to 250 are performed on each piece of image data.

According to the present embodiment, the process of transmitting the input image data to the document management server 4 and the process of acquiring a time stamp to be added to the input image data can be performed separately as described above. As is obvious, performing the processes separately is expected to yield an operational effect in the case where the time stamp acquiring process is performed and the process load of the image forming apparatus 6 is relatively small. However, in the present embodiment, a more effective arrangement is to collectively process multiple pieces of image data, rather than performing a special process of externally acquiring a time stamp over the public network 12 each time image data are acquired.

As described above, according to the present embodiment, the registering process in the document management server 4 and the time stamp acquiring process are not performed as a series of processes on each piece of image data, but the acquired image data are immediately registered in the document management server 4 when the image data are acquired while the time stamp is acquired along with other pieces of image data in accordance with the time schedule in the time stamp acquiring process. The process of acquiring a time stamp and the process of registering data in the document management server 4 can be performed separately, for the following reason.

Depending on the type of document to be read, the time authentication does not normally require the level of hour and minute, and most electronic documents can be authenticated by the date. That is, it is not always necessary to acquire a time stamp each time image data are acquired, but the time stamp can be acquired on a specified day or during a period of a few days. Therefore, according to the present embodiment, a time stamp can be acquired in accordance with a time schedule such as "collectively for each day". In the present embodiment, for example, image data are collected for each form of documents. If all image data are to be collected, not for each form, then the same time is to be set in each form ID in the schedule storage unit 42. Otherwise, only a default record is to be stored in the schedule storage unit 42. It is also possible for the time stamp acquisition unit 36 to automatically start a process at a predetermined time without using the schedule storage unit 42, and a time stamp can be acquired for all image data. In addition, a time is set in a simple manner; for example, according to the present embodiment, a date and time of the next day, or after, can be set in the schedule storage unit 42.

In the present embodiment, the explanation is given on the assumption acquiring a time stamp for all image data. However, it may not be necessary to acquire all image data in an operation. In such a case, for example, if a default (record of "F00") is not set, but the form ID designated from the image data is registered in the schedule storage unit 42, then a time stamp is acquired at a set time, and no time stamp can be added to the image data if the form ID is not registered in the schedule storage unit 42.

Second Embodiment

The above-mentioned first embodiment shows an example of setting a schedule of acquiring a time stamp in a form unit for read image data. The present embodiment shows an example of setting the schedule for each piece of image data.

Figure 8:
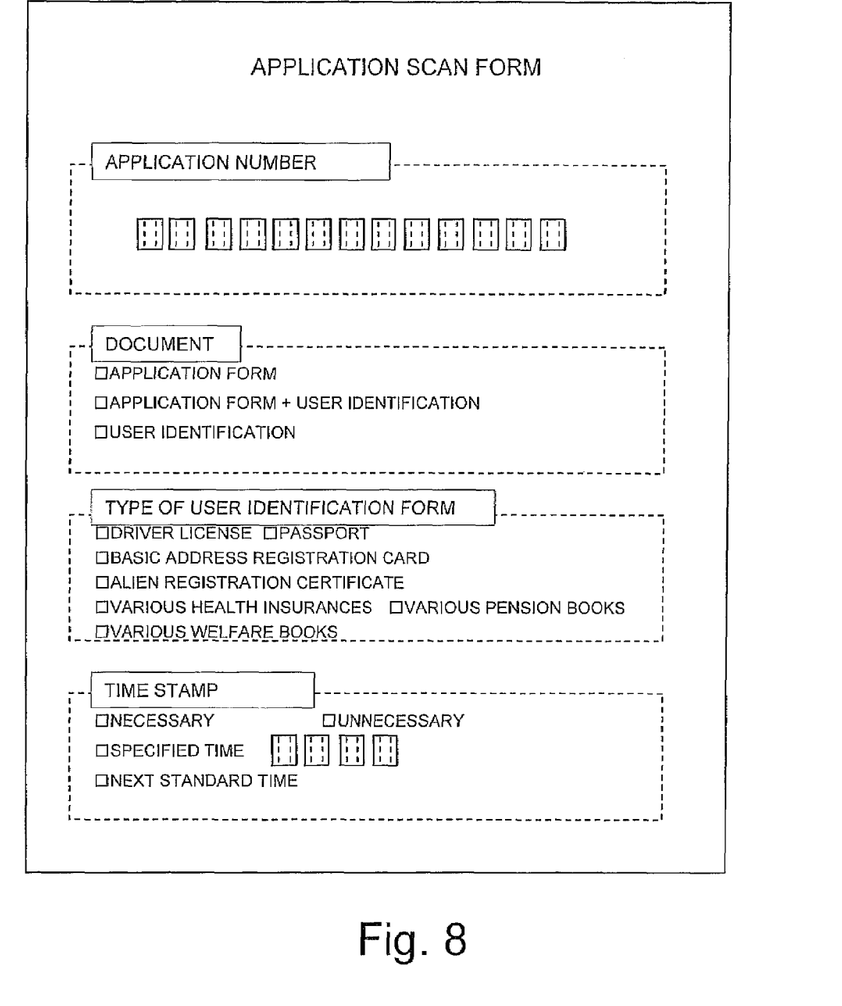
FIG. 8 shows an example of format of a directive form of a time stamp used in a second embodiment of the present invention.
Figure 9:
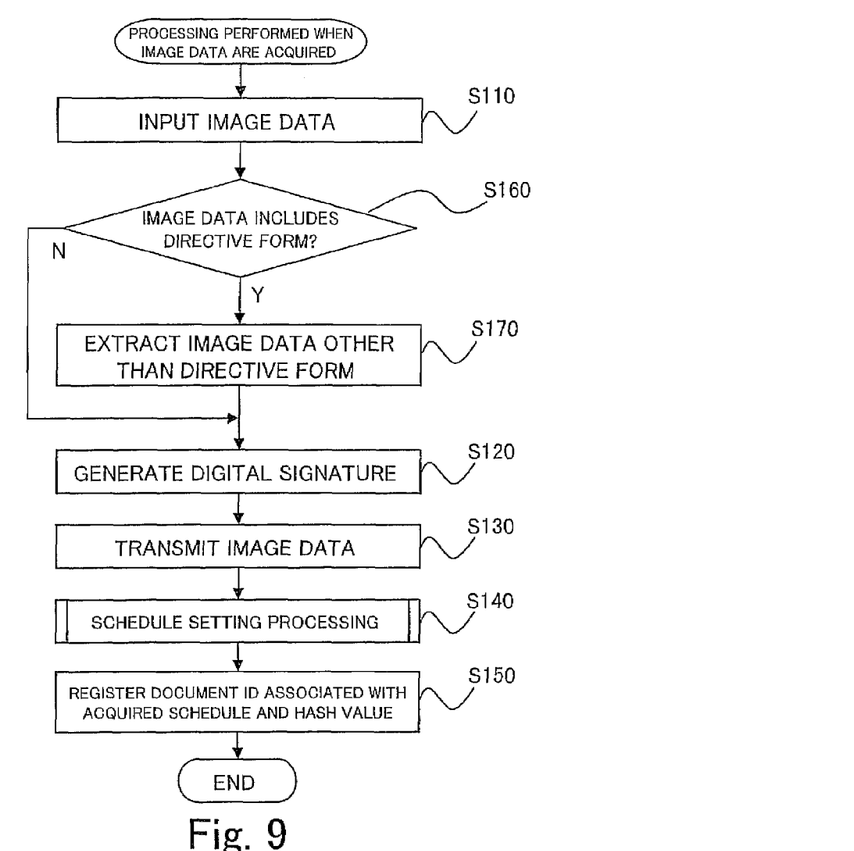
FIG. 9 is a flowchart showing processing performed when image data are acquired according to the second embodiment.
Figure 10:
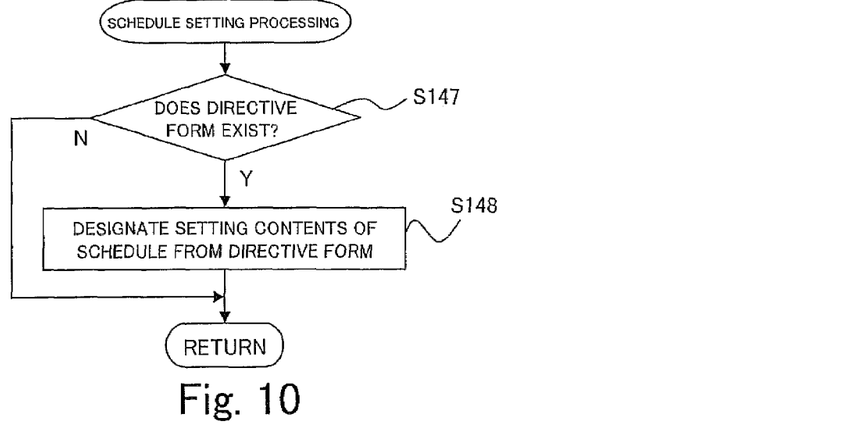
FIG. 10 is a flowchart showing schedule setting processing according to the second embodiment.

FIG. 8 shows an example format of a directive form of a time stamp used in the present embodiment. The directive form has an entry column for an application number used when an application for acquisition of a time stamp is filed, a column for specification of the type of document, a column for specification of a document for user identification, and a column for specification of a schedule of a time stamp. Among the columns, the column for specification of a schedule has check boxes for the necessity of a time stamp, specification as to whether or not the time is to be specified if a time stamp is acquired, the specified time if the time is specified, and the standard time if the time is not specified, The operation according to the present embodiment is explained below by reference to the flowchart shown in FIGS. 9 and 10. FIG. 9 is a flowchart corresponding to FIG. 4 relating to the first embodiment, and FIG. 10 is a flowchart corresponding to FIG. 5 according to the first embodiment. Other processes are the same as the processes in the first embodiment. Identical processes in the flowcharts are assigned the same step numbers, and repeated explanations are appropriately omitted. The configuration of the system according to the present embodiment is the same as the configuration in the first embodiment.

When a time stamp is to be added to the document to be an electronic data document, a user enters a necessary item on the specified form, and the scanner 14 reads the item along with the document.

The data input unit 26 inputs image data generated in the reading operation (step 110). By analyzing each piece of the input image data, a check is made as to whether or not there is image data to be read on the specified form (step 160). Since the directive form for use in the present embodiment is a standardized form, the data input unit 26 determines the presence/absence of the image data to be read on the directive form according to a predetermined method. The predetermined method is, for example, to print identification information such as a bar code, etc. at a predetermined position on the form, or to register in advance the image data of the directive form in the computer 24. Thus, the presence/absence of the directive form can be easily determined. When the image data of the directive form are contained in the read image data, the data input unit 26 extracts image data other than the image data of the directive form (step 170), and passes the data to the digital signature unit 28 and the data transmission unit 30 at the subsequent stages. Then, the image data signed by the digital signature unit 28 are transmitted to the document management server 4 by the data transmission unit 30 (steps 120 and 130).

If image data of the directive form exist (step 147), the schedule setting unit 32 designates the contents of the schedule specified by analyzing the image data; that is, the time at which a time stamp is acquired (step 148). The contents of the entry by a user can be easily determined by means of existing technology, such as OCR, etc., loaded into the image forming apparatus 6. Therefore, the schedule setting unit 32 can recognize the time entered by the user. When a standard time is selected, the time set in advance in the schedule storage unit 42 or another storage device used in the first embodiment is read and used as a standard time. When no directive form is present, it is assumed that there is no instruction to acquire a time stamp in the present embodiment.

Turning back to FIG. 9, when the schedule for the transmitted image data is set as described above, the attribute information registration unit 34 associates the document ID identifying the image data with the schedule designated by the schedule setting unit 32, the hash value generated when the signature is generated, and the attribute information registration unit registers the resultant data as the attribute information about the image data in the attribute information storage unit 44 (step 150).

Since the subsequent processes are the same as those in the first embodiment, repeated explanations are omitted here, but according to the present embodiment, the timing of acquiring a time stamp can be set for each piece of image data using a directive form.

In the present embodiment, a directive form is used. However, by preparing an electronic directive form, the present embodiment can be applied also when image data transmitted over a network by electronic mail, etc. are input without the scanner 14 for reading data.

As a method of setting a timing of acquiring a time stamp, different embodiments are explained as the first and second embodiments. Other methods can also be used in setting a time schedule. For example, when a document is read by the scanner 14 in response to an instruction to perform an operation from the operation panel 18 of the image forming apparatus 6, a user is apparently located at the image forming apparatus 6. Therefore, the screen for specification of whether or not a time stamp is acquired or a time of acquisition of the time stamp is displayed on the operation panel 18 so that the user can input data. In this case, the timing of acquiring a time stamp can be set for each piece of image data. A schedule is not set by individually setting the methods, but the methods can be used in combination by assigning a priority. For example, when the first priority is assigned to use of a directive form, and when a document to be managed and the directive form are read together, the instruction entered on the form is executed. If the directive form is not read, the form ID of the read document assigned the second priority is adopted.

The present invention is most effective when it is applied to the image forming apparatus 6 in each of the above-mentioned embodiments, but it also can be realized in a general-purpose computer.

According to an aspect of the invention, an image forming apparatus having a network communication function, includes a data input unit which inputs digital data; a data transmission unit which transmits the input digital data to a data management server for management of data; a digest generation unit which generates a digest of the input digital data; a digest storage unit which stores the digest generated by the digest generation unit; a time stamp acquisition unit which acquires a time stamp for authentication of an input time of the digital data from a time stamp station by issuing a time stamp request including the stored digest at a scheduled time; and a data management directive unit which transmits the acquired time stamp to the data management server for management of the time stamp and the transmitted digital data, associated with each other.

According to another aspect of the invention, the image forming apparatus further may include a schedule setting unit which sets a time schedule for acquiring a time stamp.

According to further aspect of the invention, the schedule setting unit may extract schedule designation information from the input digital data, and sets, based on the extracted schedule designation information, the time schedule for acquiring the time stamp to be added to the digital data.

According to further aspect of the invention, the schedule setting unit may allow a user using a user interface unit of the image forming apparatus to set the time schedule for acquiring the time stamp to be added to the digital data input by the data input unit.

According to further aspect of the invention, the schedule setting unit may extract schedule designation information from the input digital data, and sets a time schedule for acquiring a time stamp to be added to the input digital data, based on a timing table in which a time stamp acquisition timing and schedule designation information are set.

According to further aspect of the invention, the image forming apparatus further may include an image reading unit which reads a medium to generate a digital data, wherein: the image reading unit reads, with the medium, a time stamp acquisition directive data; the data input unit also inputs the time stamp acquisition directive data; and the schedule setting unit sets a time schedule for acquiring a time stamp to be added to the digital data based on the time stamp acquisition directive data.

According to further aspect of the invention, a storage medium readable by a computer stores a program of instructions executable by the computer to perform a function for time stamp acquisition, the function includes inputting digital data; transmitting the input digital data to a data management server for management of data; generating a digest of the input digital data; storing the digest generated by the digest generation unit; acquiring a time stamp for authentication of an input time of the digital data from a time stamp station by issuing a time stamp request including the stored digest at a scheduled time; and transmitting the acquired time stamp to the data management server for management of the time stamp and the transmitted digital data, associated with each other.

According to further aspect of the invention, the function further may include setting a time schedule for acquiring a time stamp.

According to further aspect of the invention, the function further may include extracting schedule designation information from the input digital data; and setting, based on the extracted schedule designation information, the time schedule for acquiring the time stamp to be added to the digital data.

According to further aspect of the invention, the function further may include allowing a user using a user interface unit to set the time schedule for acquiring the time stamp to be added to the digital data input by the data input unit.

According to further aspect of the invention, a digital data management system includes a data input unit which inputs digital data; a digital data storage unit which stores the digital data; a digest generation unit which generates a digest of the input digital data; a digest storage unit which stores the digest generated by the digest generation unit; a time stamp acquisition unit which acquires a time stamp for authentication of an input time of the digital data from a time stamp station by issuing a time stamp request including the stored digest at a scheduled time; and a time stamp addition unit which adds the acquired time stamp to the stored digital data.

According to further aspect of the invention, a time stamp acquiring method includes inputting digital data; transmitting the input digital data to a data management server for management of data; acquiring a time stamp for authentication of an input time of the digital data from a time stamp station by issuing a time stamp request including a digest generated from the transmitted digital data at a scheduled time; and transmitting the acquired time stamp to the data management server for management of the time stamp and the transmitted digital data, associated with each other.

According to further aspect of the invention, the time stamp acquiring method further may include extracting schedule designation information from the input digital data; and setting, based on the extracted schedule designation information, the time schedule for acquiring the time stamp to be added to the digital data.

According to further aspect of the invention, the time stamp acquiring method further may include allowing a user using a user interface unit to set the time schedule for acquiring the time stamp to be added to the digital data input by the data input unit.

What is claimed is:

1. An image forming apparatus having a network communication function, comprising:
   a data input unit which receives and inputs digital image data;
   a data transmission unit which transmits the input digital image data to a data management server for management of data, the input digital image data being transmitted to the data management server without an associated time stamp;
   a digest generation unit which generates a digest of the input digital image data;
   a digest storage unit which stores the digest generated by said digest generation unit;
   a time stamp acquisition unit which acquires a time stamp for authentication of an input time of the input digital image data from a time stamp station;
   said time stamp acquisition unit issuing a time stamp request for acquiring the time stamp, including the stored digest, at a scheduled time;
   a data management directive unit which transmits the acquired time stamp to the data management server, the transmitted time stamp being used, by the data management server, to manage the previously transmitted digital image data associated with the acquired time stamp; and
   a schedule setting unit which sets the scheduled time for acquiring the time stamp;
   said schedule setting unit extracting schedule designation information based upon an analysis of the input digital image data, and setting, based on the extracted schedule designation information, the time schedule for acquiring the time stamp.

2. The image forming apparatus according to claim 1, wherein said schedule setting unit allows a user using a user interface unit of the image forming apparatus to set the time schedule for acquiring the time stamp.

3. The image forming apparatus according to claim 1, wherein said schedule setting unit extracts schedule designation information from the input digital image data, and sets a time schedule for acquiring the time stamp, based on a timing table in which a time stamp acquisition timing and schedule designation information are set.

4. The image forming apparatus according to claim 1, further comprising:
   an image reading unit which reads a medium to generate digital image data to be received by said data input unit;
   said image reading unit reads, with the medium, time stamp acquisition directive data;
   said data input unit receives and inputs the time stamp acquisition directive data; and
   said schedule setting unit sets a time schedule for acquiring a time stamp associated with the digital image data generated by said image reading unit based on the time stamp acquisition directive data.

5. The image forming apparatus according to claim 1, wherein said schedule setting unit determines a type of document based upon an analysis of the input digital image data, and sets, based on the determined type of document, the time schedule for acquiring the time stamp.

6. A storage device readable by a computer, the storage device storing a program of instructions executable by the computer to perform a function for time stamp acquisition, the function comprising:
   inputting digital image data;
   transmitting the input digital image data to a data management server for management of data, the input digital image data being transmitted to the data management server without an associated time stamp;
   generating a digest of the input digital image data;
   storing the digest generated by the digest generation unit;
   acquiring a time stamp for authentication of an input time of the input digital image data from a time stamp station, the time stamp acquisition being realized by issuing a time stamp request for acquiring the time stamp, including the stored digest, at a scheduled time;
   transmitting the acquired time stamp to the data management server, the transmitted time stamp being used, by the data management serer, to manage the previously transmitted digital image data associated with the acquired time stamp;
   setting a time schedule for acquiring the time stamp;
   extracting schedule designation information based upon an analysis of the input digital image data; and
   setting, based on the extracted schedule designation information, the time schedule for acquiring the time stamp.

7. The storage device according to claim 6, the function further comprising:
   allowing a user a user interface to set the time schedule for acquiring the time stamp.

8. The storage device according to claim 6, the function further comprising:
   determining a type of document based upon an analysis of the input digital image data; and
   setting, based on the determined type of document, the time schedule for acquiring the time stamp.

9. A digital data management system comprising:
   a data input unit which inputs digital image data;
   a digital data storage unit which stores the input digital image data, the input digital image data being stored without an associated time stamp;
   a digest generation unit which generates a digest of the input digital image data;
   a digest storage unit which stores the digest generated by the digest generation unit;
   a time stamp acquisition unit which acquires a time stamp for authentication of an input time of the input digital image data from a time stamp station;
   said time stamp acquisition unit issuing a time stamp request for acquiring the time stamp, including the stored digest, at a scheduled time;
   a time stamp addition unit which adds the acquired time stamp to the stored digital image data; and a schedule setting unit which sets the scheduled time for acquiring the time stamp;

said schedule setting unit extracting schedule designation information based upon an analysis of the input digital image data, and setting, based on the extracted schedule designation information, the time schedule for acquiring the time stamp.

10. A time stamp acquiring method comprising:

inputting digital image data;

transmitting the input digital image data to a data management server for management of data, the input digital image data being transmitted to the data management server without an associated time stamp;

acquiring a time stamp for authentication of an input time of the input digital image data from a time stamp station, the time stamp acquisition being realized by issuing a time stamp request for acquiring the time stamp, including a digest generated from the transmitted digital image data, at a scheduled time;

transmitting the acquired time stamp to the data management server, the transmitted time stamp being used, by the data management server, to manage the previously transmitted digital image data associated with the acquired time stamp;

extracting schedule designation information based upon an analysis of the input digital image data; and setting, based on the extracted schedule designation information, the time schedule for acquiring the time stamp.

11. The time stamp acquiring method according to claim 10, further comprising:

allowing a user using a user interface unit to set the time schedule for acquiring the time stamp.

12. The time stamp acquiring method according to claim 10, further comprising:

determining a type of document based upon an analysis of the input digital image data; and setting, based on the determined type of document, the time schedule for acquiring the time stamp.

* * * * *